(12) United States Patent
Izumino et al.

(10) Patent No.: US 8,029,373 B2
(45) Date of Patent: Oct. 4, 2011

(54) FIXED CONSTANT VELOCITY UNIVERSAL JOINT

(75) Inventors: Junichi Izumino, Iwata (JP); Manabu Hoshino, Iwata (JP)

(73) Assignee: NTN Corporation, Osaka (JP)

( * ) Notice: Subject to any disclaimer, the term of this patent is extended or adjusted under 35 U.S.C. 154(b) by 568 days.

(21) Appl. No.: 12/084,324

(22) PCT Filed: Nov. 15, 2006

(86) PCT No.: PCT/JP2006/322742
§ 371 (c)(1),
(2), (4) Date: Apr. 30, 2008

(87) PCT Pub. No.: WO2007/058201
PCT Pub. Date: May 24, 2007

(65) Prior Publication Data
US 2009/0258716 A1    Oct. 15, 2009

(30) Foreign Application Priority Data

Nov. 18, 2005 (JP) .................................. 2005-334586

(51) Int. Cl.
*F16D 3/224* (2011.01)
(52) U.S. Cl. ........................................ 464/145; 464/906
(58) Field of Classification Search .................. 464/140, 464/145, 146, 906
See application file for complete search history.

(56) References Cited

U.S. PATENT DOCUMENTS

| | | |
|---|---|---|
| 3,879,960 A | 4/1975 | Welschof et al. |
| 4,156,353 A | 5/1979 | Welschof |
| 4,319,465 A | 3/1982 | Ito et al. |
| 4,575,362 A | 3/1986 | Girguis |
| 4,820,240 A | 4/1989 | Girguis |

(Continued)

FOREIGN PATENT DOCUMENTS

DE    195 14 868    5/1996

(Continued)

OTHER PUBLICATIONS

Supplementary European Search Report dated Feb. 5, 2010 in corresponding European Application No. 06832673.5.

(Continued)

*Primary Examiner* — Gregory Binda
(74) *Attorney, Agent, or Firm* — Wenderoth, Lind & Ponack, L.L.P.

(57) ABSTRACT

A fixed constant velocity universal joint of a structure, which easily allows incorporation of an inner ring into a cage without impairing a function of the joint, is provided. The fixed constant velocity universal joint has an outer ring having in an inner spherical surface thereof a plurality of track grooves arranged at equal circumferential intervals and extending axially toward an open end, an inner ring having in an outer spherical surface thereof a plurality of axially extending track grooves paired with the track grooves of the outer ring and arranged at equal circumferential intervals, a plurality of balls interposed between the track grooves of the outer ring and the track grooves of the inner ring, for transmitting torque, and a cage interposed between the inner spherical surface of the outer ring and the outer spherical surface of the inner ring, for holding the balls, in which an outer ring open end side of the outer spherical surface of the inner ring is cut off, with a boundary portion between a cutoff portion thereby obtained and the outer spherical surface being rounded.

6 Claims, 8 Drawing Sheets

U.S. PATENT DOCUMENTS

| | | |
|---|---|---|
| 5,167,584 A | 12/1992 | Krude |
| 6,431,988 B1 | 8/2002 | Tone |
| 2006/0217207 A1* | 9/2006 | Hoshino et al. ............... 464/145 |

FOREIGN PATENT DOCUMENTS

| | | |
|---|---|---|
| EP | 1 669 622 | 6/2006 |
| GB | 2 036 255 | 6/1980 |
| GB | 2 127 132 | 4/1984 |
| JP | 53-48150 | 5/1978 |
| JP | 60-249728 | 12/1985 |
| JP | 08-6758 | 1/1996 |
| JP | 09-177810 | 7/1997 |
| JP | 2000-154833 | 6/2000 |
| JP | 2000-230568 | 8/2000 |
| JP | 2001-304282 | 10/2001 |
| JP | 2005-106233 | 4/2005 |
| JP | 2005-221033 | 8/2005 |
| WO | 92/14943 | 9/1992 |

OTHER PUBLICATIONS

Graf Von Seherr-Thoss, Schmelz, Aucktor: "Gelenke and Gelenkwellen", 2002, Springer Verlag, Berlin, XP002564684, pp. 168-173.

International Search Report mailed Dec. 12, 2006 for International Application No. PCT/JP2006/322742.

* cited by examiner

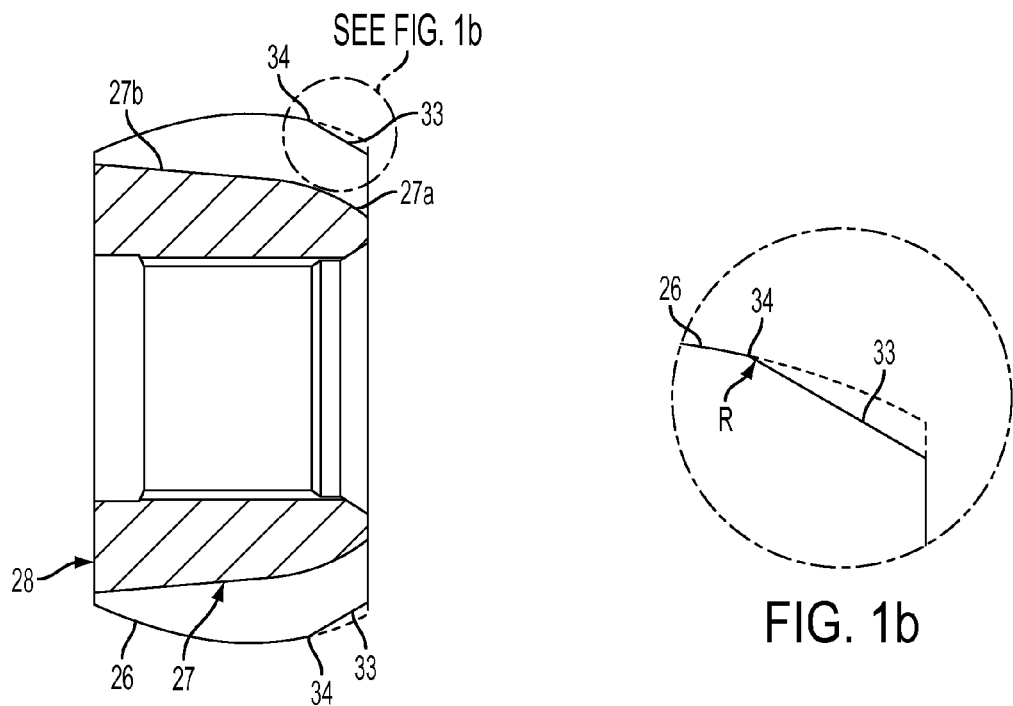
FIG. 1a
FIG. 1b
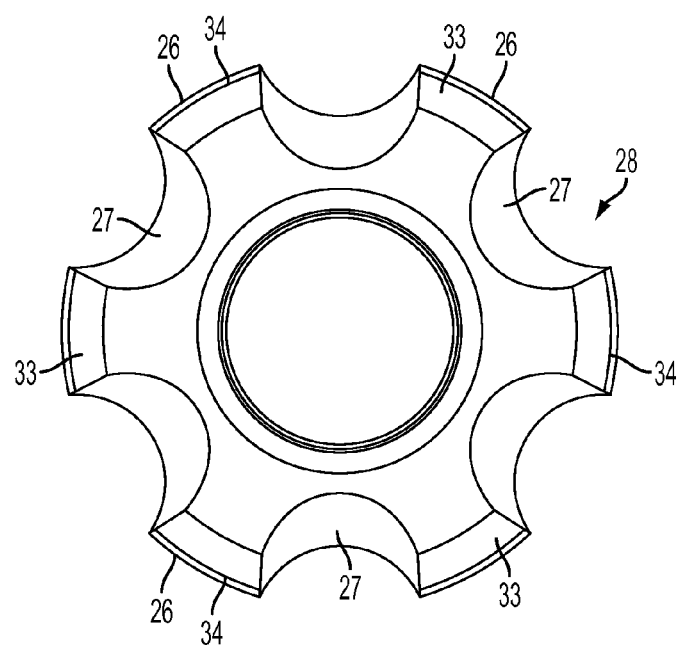
FIG. 1c

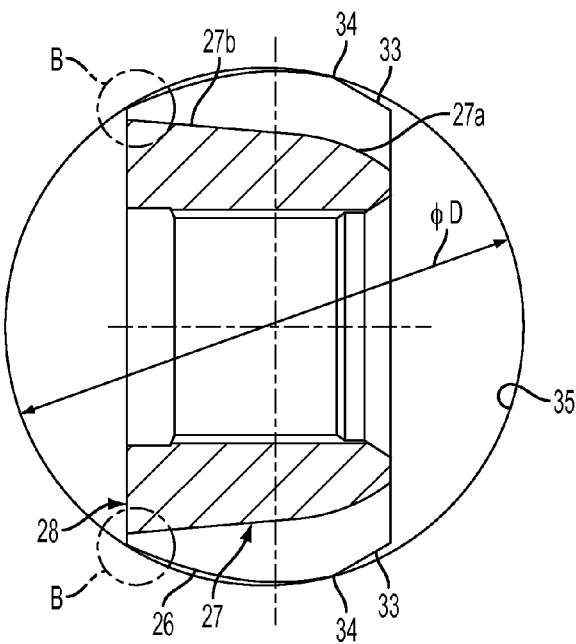
FIG. 4
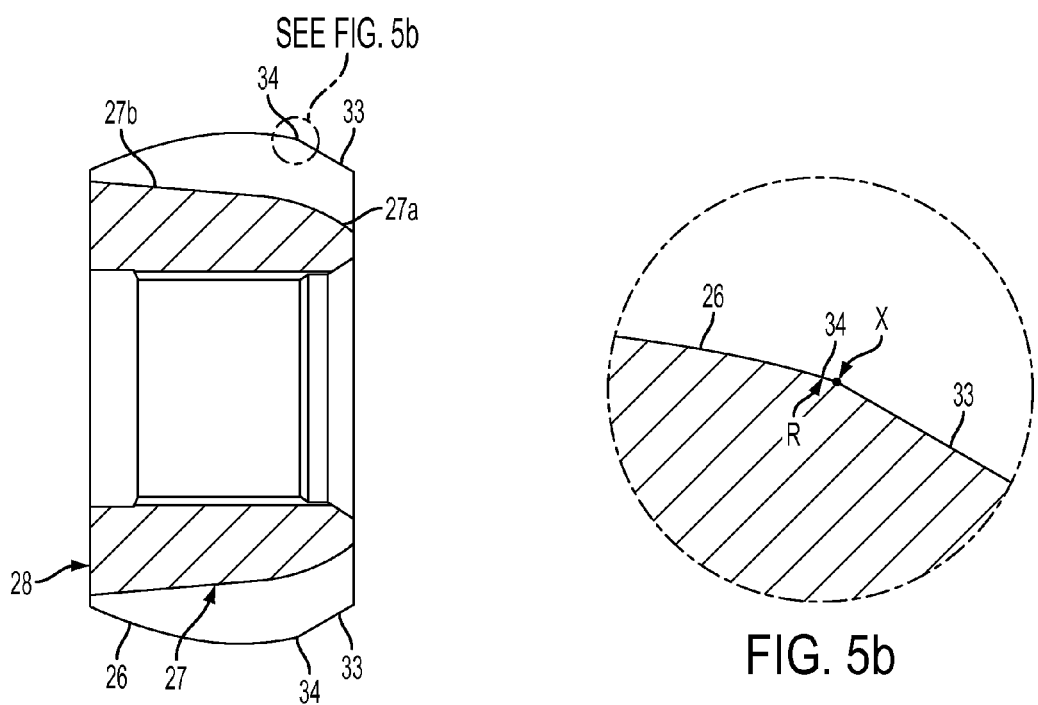
FIG. 5a
FIG. 5b

FIXED CONSTANT VELOCITY UNIVERSAL JOINT

BACKGROUND OF THE INVENTION

I. Technical Field

The present invention relates to a fixed constant velocity universal joint, and more specifically, to a fixed constant velocity universal joint which is used in the power transmitting system of automobiles and various industrial machines and which solely allows angular displacement between two shafts on the driving side and the driven side.

II. Description of the Related Art

A fixed constant velocity universal joint is an example of a constant velocity universal joint used as a means for transmitting torque from the engine of an automobile to the wheels at constant velocity. The fixed constant velocity universal joint connects two shafts on the driving side and the driven side and is equipped with a structure allowing constant-velocity transmission of rotational torque even when the two shafts assume an operating angle.

Generally speaking, a fixed constant velocity universal joint is equipped with an outer ring serving as an outer member having a plurality of track grooves formed in an inner spherical surface thereof at equal circumferential intervals so as to extend in the axial direction, an inner ring serving as an inner member having a plurality of track grooves paired with the track grooves of the outer ring and formed in an outer spherical surface thereof at equal circumferential intervals so as to extend in the axial direction, a plurality of balls interposed between the track grooves of the outer ring and the track grooves of the inner ring, for transmitting torque, and a cage interposed between the inner spherical surface of the outer ring and the outer spherical surface of the inner ring, for holding the balls. The plurality of balls are accommodated in a pocket formed in the cage and are arranged at equal circumferential intervals (see, for example, JP 53-48150 A, DE 19514868, JP 08-6758 B, and JP 09-177810 A).

When a constant velocity universal joint of this type is used, for example, for an automotive drive shaft, the outer ring is connected to a driven shaft, and a drive shaft extending from a slide type constant velocity universal joint mounted to a differential on the vehicle body side is connected to the inner ring through spline fit-engagement. In this constant velocity universal joint, when an operating angle is assumed between the outer ring and the inner ring, each of the balls accommodated in the cage is always maintained within the bisector plane of any operating angle, thereby securing the constant velocity property of the joint.

In such a fixed constant velocity universal joint, when incorporating the inner ring into the cage, it is general practice to insert the inner ring into the cage while rotating the inner ring by 90° around the Y-axis, and fit the outer spherical surface of the inner ring into the pocket of the cage; then, the inner ring is rotated by 90° around the Y-axis and the axis of the inner ring is matched with the axis of the cage to arrange the inner ring in normal attitude.

As shown in FIG. 9a and FIG. 9b, a method is available according to which a distance d between a boundary portion between one track groove 7 and the outer spherical surface 6 of an inner ring 8 and a boundary portion between the opposing track groove 7 and the outer spherical surface 6 is previously set smaller than a socket diameter D of a cage 10; when incorporating the inner ring 8 into the cage 10, the inner ring 8 is inserted straight into the cage 10 via a socket portion 15 while rotated by 90° around the Y-axis, and then the inner ring 8 is rotated by 90° around the Y-axis to match the axis of the inner ring 8 with the axis of the cage 10, thereby arranging the inner ring in a normal attitude.

JP 53-48150 A discloses a method in which the joint opening side portion of the outer spherical surface of the inner ring is cut off, and in which the inner ring is inserted into the cage while being rotated by 90° around the Y-axis to fit the outer spherical surface of the inner ring into the pocket of the cage; then, the inner ring is rotated by 90° around the Y-axis to match the axis of the inner ring with the axis of the cage, thus arranging the inner ring in normal attitude.

DE 19514868 discloses a method in which the joint opening side portion of the outer spherical surface of the inner ring is cut off with respect to a part of the phases, and in which the inner ring is inserted into the cage while being rotated by 90° around the Y-axis to fit the outer spherical surface of the inner ring into the pocket of the cage; then, the inner ring is rotated by 90° around the Y-axis to match the axis of the inner ring with the axis of the cage, thereby arranging the inner ring in a normal attitude. Here, the term phase means a circumferential position of any of a plurality of outer spherical surface portions defined by the track grooves.

JP 08-6758 B discloses a method in which the boundary portions between the outer spherical surface of the inner ring and the track grooves thereof are chamfered, and in which the chamfered portions of a part of the phases are made larger than the chamfered portions of the other phases, whereby, after inserting the inner ring into the cage straight via the socket portion of the cage while rotating the inner ring by 90° around the Y-axis, the inner ring is rotated by 90° around the Y-axis to match the axis of the inner ring with the axis of the cage, thereby arranging the inner ring in a normal attitude.

JP 09-177810 A discloses a method in which the distance d between a boundary portion between one track groove 7 and the outer spherical surface 6 of the inner ring 8 and the boundary portion between the opposing track groove 7 and the outer spherical surface 6 is previously set smaller than the socket diameter D of the cage 10 (see FIGS. 9a and 9b): when incorporating the inner ring 8 into the cage 10, the inner ring 8 is inserted straight into the cage 10 via the socket portion 15 while being rotated by 90° around the Y-axis, and then the inner ring 8 is rotated by 90° around the Y-axis to match the axis of the inner ring 8 with the axis of the cage 10, thereby arranging the inner ring in normal attitude.

SUMMARY OF THE INVENTION

In recent years, from the viewpoint of enlarging the internal space of an automobile, an increase in wheel base length is sometimes effected. However, in order that an increase in vehicle turning radius may not be involved as a result of such increase, there is a demand for an increase in the steering angle of the front wheels through realization of a high-angle structure for a fixed constant velocity universal joint used as a connection joint for an automotive drive shaft or the like.

In the fixed constant velocity universal joints as disclosed in JP 53-48150 A, DE 19514868, JP 08-6758 B, and JP 09-177810 A, it is necessary to increase the axial length of the track grooves of the inner ring and the outer ring to attain a structure with which a large operating angle meeting the requirement for a high-angle structure can be assumed. In this case, an increase in the axial length of the track grooves of the inner ring and the outer ring results in an increase in the axial widths of the inner ring and the outer ring.

In particular, when the axial width of the inner ring is increased, even when the distance d between a boundary portion between one track groove 7 and the outer spherical surface 6 of the inner ring 8 and the boundary portion between the opposing track groove 7 and the outer spherical surface 6 is previously set smaller than the socket diameter D of the cage 10 as shown in FIGS. 9a and 9b, when inserting the inner ring 8 via the socket portion 15 of the cage 10, a part of the contour of the inner ring 8, that is, the outer ring bottom side portion (the portion indicated by symbol A in the drawing) of the outer spherical surface 6 of the inner ring 8, sticks out of the region of the socket portion 15 as shown in FIG. 10, to thereby cause interference, making it difficult for the inner ring 8 to be inserted straight via the socket portion 15 of the cage 10.

It is accordingly an object of the present invention to provide a fixed constant velocity universal joint of a structure, which easily allows linear incorporation of the inner ring into the cage without impairing the function of the joint.

The present invention relates to a fixed constant velocity universal joint including: an outer member having in an inner spherical surface thereof a plurality of track grooves arranged at equal circumferential intervals and extending axially toward an opening; an inner member having in an outer spherical surface thereof a plurality of axially extending track grooves paired with the track grooves of the outer member and arranged at equal circumferential intervals; a plurality of balls interposed between the track grooves of the outer member and the track grooves of the inner member, for transmitting torque; and a cage interposed between the inner spherical surface of the outer member and the outer spherical surface of the inner member, for holding the balls, in which an outer member opening side portion of the outer spherical surface of the inner member is cut off, with a boundary portion between the cutoff portion and the outer spherical surface being rounded.

According to the present invention, the outer member opening side portion of the outer spherical surface of the inner member is cut off. As a result, when, at the time of incorporation of the inner member into the cage, the inner member is inserted via the socket portion of the cage while rotated by 90° with respect to the cage, the contour of the inner member, that is, the outer spherical surface of the inner member, is contained so as to avoid interference with the socket portion of the cage in all the phases. Therefore, linear insertion of the inner member via the socket portion of the cage is facilitated.

Further, the boundary portion between the above-mentioned cutoff portion and the outer spherical surface is rounded, whereby even when a tensile load is exerted in the axial direction of the joint, it is possible to prevent the boundary portion between the cutoff portion and the outer spherical surface from being engaged in the inner spherical surface of the cage.

The term socket portion implies each of the axial end openings of the inner spherical surface of the cage, allowing easy insertion of the inner member into the cage when incorporating the inner member into the cage.

In the present invention, in addition to the construction in which the outer member opening side portion of the outer spherical surface of the inner member is cut off and in which the boundary portion between the cutoff portion and the outer spherical surface is rounded, it is desirable to provide chamfered portions at the boundary portions between the outer spherical surface of the inner member and the track grooves.

With this construction, it is possible to make the requisite chamfered portions for the insertion into the cage smaller as compared with the above-mentioned case in which the chamfered portions are provided at the boundary portions between the outer spherical surface of an inner member with no cutoff portion and the track grooves thereof, making it possible to secure the requisite load capacity for the tracks.

In recent years, from the viewpoint of enlarging the internal space of an automobile, an increase in wheel base length is sometimes effected. However, in order that an increase in vehicle turning radius may not be involved as a result of such increase, there is a demand for an increase in the steering angle of the front wheels through realization of a high-angle structure for a fixed constant velocity universal joint used as a connection joint for an automotive drive shaft or the like.

In order to realize a high-angle structure for a fixed constant velocity universal joint, there is adopted a structure in which the track grooves of the outer member are tapered so as to be linearly diverged toward the opening, in which the track grooves of the inner member are tapered so as to be linearly diverged toward a side opposite to the opening, in which an outer spherical surface center and an inner spherical surface center of the cage are offset axially in opposite directions by the same distance with respect to a joint center, and in which a center of curvature of the track grooves of the outer member and a center of curvature of the track grooves of the inner member are offset with respect to the joint center by an amount corresponding to the cage offset amount.

In a fixed constant velocity universal joint in which such a high-angle structure has been realized, when the outer member opening side portion of the outer spherical surface of the inner member is cut off, and the boundary portion between the cutoff portion and the outer spherical surface is rounded, it is possible to realize a structure capable of assuming a large operating angle to meet the requirement for a high-angle structure, so elongation of the track grooves of the inner member and the outer member in the axial direction is facilitated.

In the present invention, the track grooves of the outer member and the inner member are tapered, whereby an increase in operating angle is easily realized without involving an increase in the outer diameter of the outer member. In this regard, in order that the strength and workability of the outer member may not be reduced even when the wall thickness of the outer member is reduced, the influence and tendency due to the tapering of the track grooves were examined with respect to the inner elements of the constant velocity universal joint, with the result that the upper limit value of the tapering angle of the track grooves was decided on 12° as the optimum value thereof.

The applicant of the present invention conducted examination by static inner force analysis and finite element method (FEM) analysis while securing the requisite strength and durability, which constitute the conventional required basic performance, narrowing down the range of the tapering angle of the track grooves to set an optimum range thereof. Further, the evaluation results of samples with different tapering angles were checked for consistency with the analysis results.

According to the present invention, the outer member opening side portion of the outer spherical surface of the inner member is cut off. As a result, at the time of incorporation of the inner member into the cage, the contour of the inner member, that is, the outer spherical surface of the inner member, is contained so as to avoid interference with the socket portion of the cage in all phases, so linear insertion of the inner member via the socket portion of the cage is facilitated. Further, the boundary portion between the cutoff portion and the outer spherical surface is rounded, whereby, even when a tensile load is exerted in the axial direction of the joint, it is possible to prevent the boundary portion between the cutoff portion and the outer spherical surface from being engaged in the inner spherical surface of the cage. As a result, the inner member can be linearly inserted into the socket portion of the cage without impairing the function of the joint, enabling the inner member to be easily incorporated into the cage. In particular, this effect is conspicuous in a tapered, high-angle constant velocity universal joint in which the track grooves of the outer member are linearly diverged toward the opening.

BRIEF DESCRIPTION OF THE DRAWINGS

FIG. 1a is a sectional view of an inner ring showing a fixed constant velocity universal joint according to an embodiment of the present invention.

FIG. 1b is an enlarged portion of FIG. 1a.

FIG. 1c is a right-hand side view of FIG. 1a.

FIG. 3b is a side view in section of the inner ring of 3a.

FIG. 4 is a diagram showing a state after the insertion of the inner ring into the cage according to the embodiment of the present invention.

FIG. 5a is a sectional view showing an example of a boundary portion between a cutoff portion and an outer spherical surface according to another embodiment of the present invention.

FIG. 5b is an enlarged portion of FIG. 5a.

FIG. 6b is an enlarged portion of FIG. 6a.

FIG. 9b is an enlarged portion of FIG. 9a.

DETAILED DESCRIPTION OF THE INVENTION

In the following, a fixed constant velocity universal joint according to an embodiment of the present invention will be described in detail.

Figure 2:
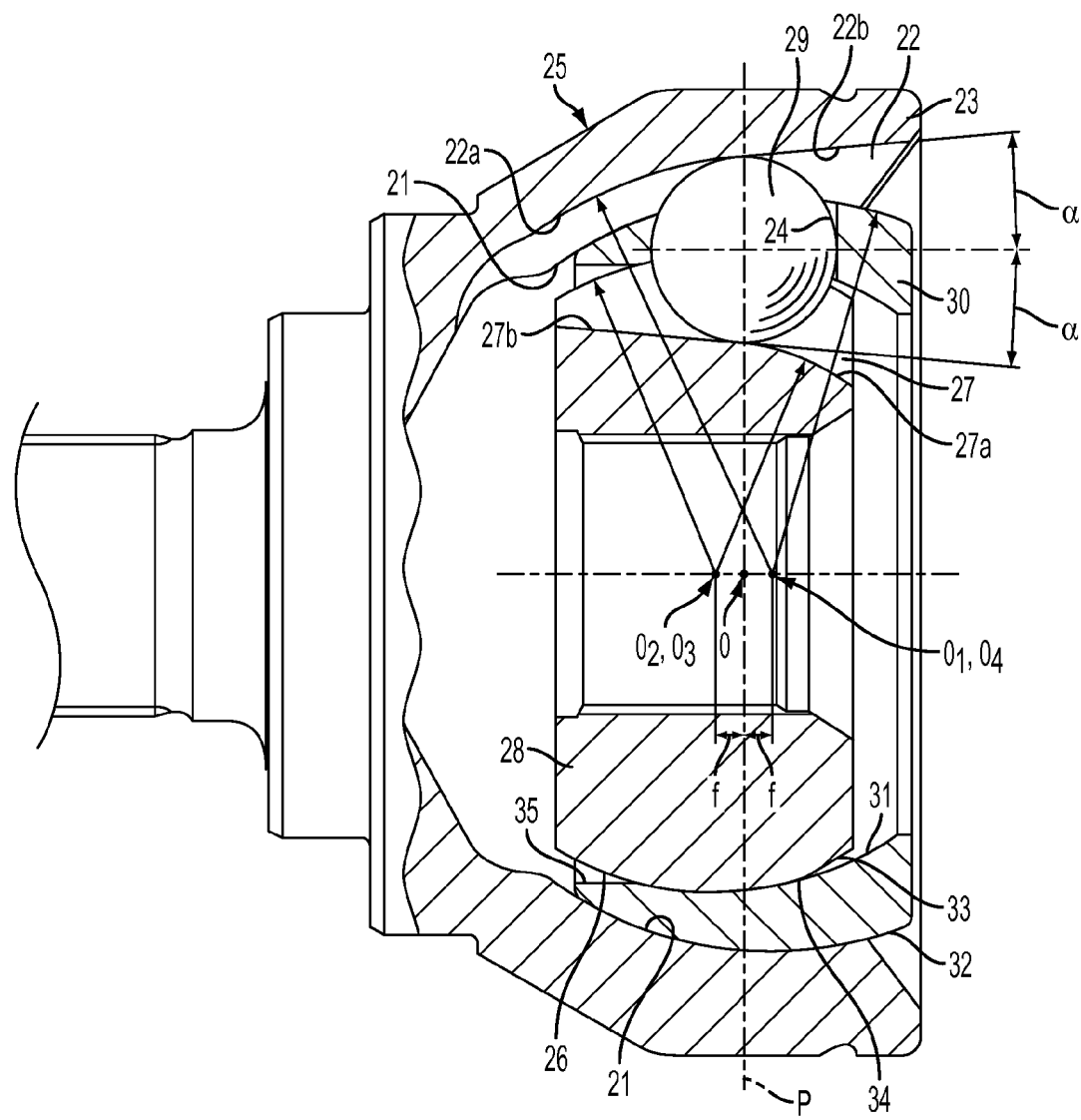
FIG. 2 is a sectional view of the general construction of the fixed constant velocity universal joint according to the embodiment of the present invention.

FIG. 2 shows a constant velocity universal joint according to an embodiment, which is equipped with an outer ring 25 serving as a cup-shaped outer member having in an inner spherical surface 21 thereof, a plurality of track grooves 22 arranged at equal circumferential intervals and extending in the axial direction toward an opening end 23, an inner ring 28 serving as an inner member having in an outer spherical surface 26, thereof a plurality of track grooves 27 paired with the track grooves 22 of the outer ring 25 and formed axially at equal circumferential intervals, a plurality of balls 29 interposed between the track grooves 22 of the outer ring 25 and the track grooves 27 of the inner ring 28, for transmitting torque, and a cage 30 interposed between the inner spherical surface 21 of the outer ring 25 and the outer spherical surface 26 of the inner ring 28, for holding the balls 29. The plurality of balls 29 are accommodated in a pocket 24 formed in the cage 30 and arranged at equal circumferential intervals.

For example, a driven shaft (not shown) is connected to a stem portion extending integrally from the outer ring 25, and a drive shaft (not shown) is connected to the inner ring 28 through spline fit-engagement, whereby torque transmission is possible while allowing angular displacement between the driven shaft and the drive shaft. In this constant velocity universal joint, when the outer ring 25 and the inner ring 28 undergo angular displacement, the balls 29 accommodated in the pocket 24 of the cage 30 are always maintained within the bisector plane at any operating angle, thus securing the constant velocity property for the joint.

In order to realize a structure capable of assuming a large operating angle, in this constant velocity universal joint, the track grooves 22 of the outer ring 25 are tapered so as to be linearly diverged toward the cup-shaped opening of the outer ring 25. That is, the track grooves 22 have arcuate bottoms 22a on the cup-shape bottom side, which is on the side opposite to the opening, and tapered bottoms 22b on the cup-shape opening side. On the other hand, the track grooves 27 of the inner ring 28 are also tapered so as to be linearly diverged toward the side opposite to the cup-shaped opening of the outer ring 25. That is, the track grooves 27 have arcuate bottoms 27a on the cup-shape opening side and tapered bottoms 27b on the cup-shape bottom side.

Further, a center of curvature $O_3$ of an inner spherical surface 31 of the cage 30, and a center of curvature $O_4$ of an outer spherical surface 32 thereof, are axially offset in opposite directions by the same distance f with respect to a joint center plane P passing the joint center O (cage offset). A center of curvature $O_1$ of the track grooves 22 of the outer ring 25 and a center of curvature $O_2$ of the track grooves 27 of the inner ring 28 respectively match the center of curvature of the inner spherical surface 21 of the outer ring 25 and the center of curvature of the outer spherical surface 26 of the inner ring 28. The center of curvature of the inner spherical surface 21 of the outer ring 25 and the center of curvature of the outer spherical surface 26 of the inner ring 28 respectively match the center of curvature $O_4$ of the outer spherical surface 32 of the cage 30 and the center of curvature $O_3$ of the inner spherical surface 31 thereof. (Thus, in the following description, the center of curvature of the inner spherical surface 21 of the outer ring 25 will also be indicated by symbol $O_4$, and the center of curvature of the outer spherical surface 26 of the inner ring 28 will also be indicated by symbol $O_3$.)

In this embodiment, the center of curvature $O_1$ of the track grooves 22 of the outer ring 25 and the center of curvature $O_2$ of the track grooves 27 of the inner ring 28 respectively match the center of curvature $O_4$ of the inner spherical surface 21 of the outer ring 25 and the center of curvature $O_3$ of the outer spherical surface 26 of the inner ring 28 to thereby reduce the track offset to zero. As a result, the depth of the arcuate bottoms 22a situated on the inner side of the outer ring 25 is not reduced toward the inner side but is of a uniform depth, so, when an operating angle is assumed, it is possible to suppress running-on of the balls 29 situated at the innermost positions of the track grooves 22.

The center of curvature $O_1$ of the track grooves 22 of the outer ring 25 and the center of curvature $O_2$ of the track grooves 27 of the inner ring 28 may be respectively axially offset in opposite directions by the same distance with respect to the center of curvature $O_4$ of the inner spherical surface 21 of the outer ring 25 and the center of curvature $O_3$ of the outer spherical surface 26 of the inner ring 28, to thereby effect track offset.

Figure 3A:
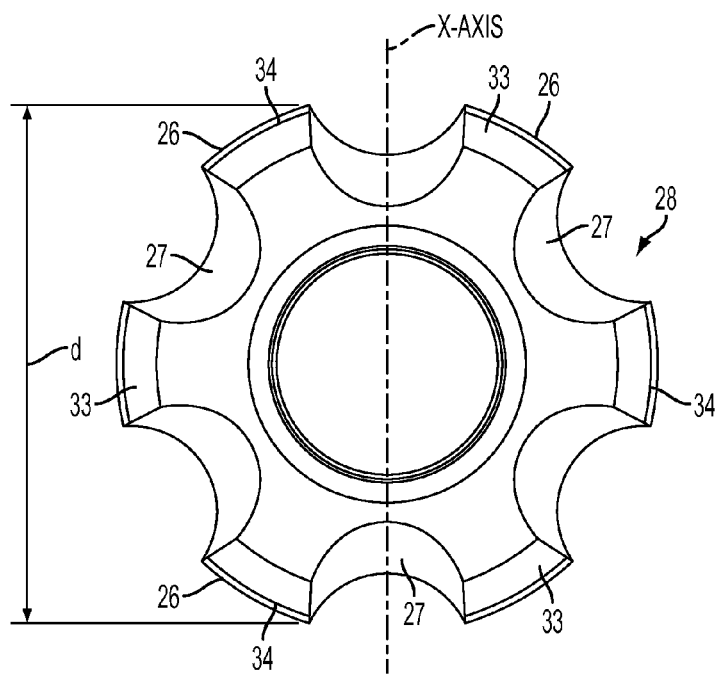
FIG. 3a is a diagram showing a state prior to insertion of the inner ring into a cage according to the embodiment of the present invention.
Figure 3B:
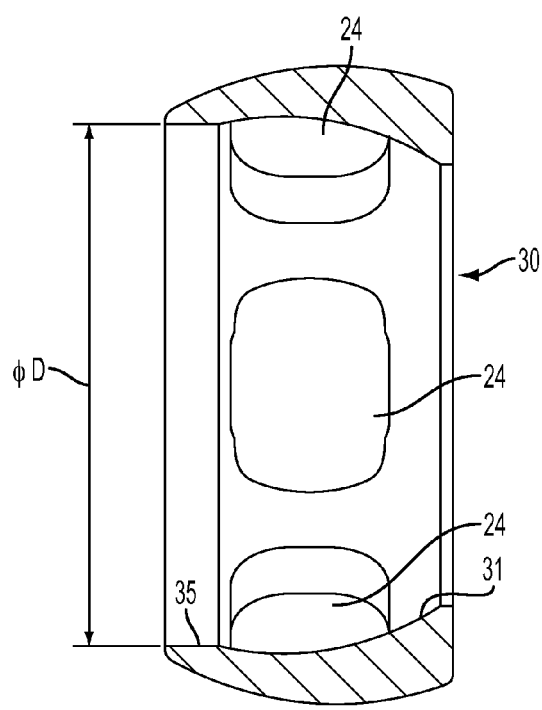

As shown in FIG. 3a and FIG. 3b, in the high-angle fixed constant velocity universal joint thus obtained, the distance d between the boundary portion between one track groove 27 and the outer spherical surface 26 and the boundary portion between the opposing track groove 27 and the outer spherical surface 26 is previously set smaller than the socket diameter D of the cage 30; when incorporating the inner ring 28 into the cage 30, the inner ring 28 is inserted into the cage 30 while being rotated by 90° around the Y-axis (see FIGS. 3a and 3b), and then the inner ring 28 is rotated by 90° around the Y-axis to match the axis of the inner ring 28 with the axis of the cage 30, thereby arranging the inner ring in normal attitude.

As shown in FIG. 1a, FIG. 1b, and FIG. 1c in the constant velocity universal joint of this embodiment, the outer ring opening side portion of the outer spherical surface 26 of the inner ring 28 is cut off in all phases, and the boundary portion 34 between the cutoff portion 33 and the outer spherical surface 26 is rounded.

In this way, the outer ring opening side portion of the outer spherical surface 26 of the inner ring 28 is cut off, whereby, at the time of incorporation of the inner ring 28 into the cage 30, when inserting the inner ring 28 into the cage 30 via a socket portion 35 of the cage 30, the inner ring 28 is, as shown in FIG. 4, contained within the region of the socket portion 35 so as to avoid interference of the contour of the inner ring 28, that is, the outer ring bottom side portion (portion B in the drawing) of the outer spherical surface 26, so the inner ring 28 can be linearly inserted via the socket portion 35 of the cage 30.

Here, the portion where firm contact between the inner ring 28 and the cage 30 occurs during operation of the joint of the present invention is the outer ring bottom side portion of the outer spherical surface 26 of the inner ring 28, and the outer ring opening side portion of the outer spherical surface 26 is not held in firm contact. Further, a sufficient depth can be secured on the outer ring opening side of the track grooves 27 of the inner ring 28 even when the above-mentioned cutoff portion 33 is provided, so the function of the joint is not affected.

In order to attain a structure capable of assuming a large operating angle to meet the demand for a high-angle structure, it is necessary for the track grooves 27 and 22 of the inner ring 28 and the outer ring 25 to be axially elongated; in this case, the axial width of the inner ring 28 and that of the outer ring 25 are increased; however, when the axial width of the inner ring 28 is increased, by cutting off the outer ring opening side portion of the outer spherical surface 26 of the inner ring 28 as described above, at the time of incorporation of the inner ring 28 into the cage 30, the contour of the inner ring 28, that is, the outer ring bottom side portion and the outer ring opening side portion of the inner ring 28 and the outer spherical surface 26, can be easily contained within the region of the socket portion 35 so that they may not interfere with the socket portion 35 of the cage 30 in all phases.

Further, the cutoff portion 33 provided on the outer ring opening side of the outer spherical surface 26 of the inner ring 28 is formed with respect to all phases of the outer spherical surface 26, so, as compared with the case in which the cutoff portion 33 is provided solely with respect to a part of the phases (see, for example, Patent Document 2), the inner ring 28 can be machined more easily through turning, the load is more uniformly applied to the die during forging to provide superior workability, and a reduction in the weight of the inner ring 28 can be achieved. Further, the contact between the inner ring 28 and the cage 30 is uniform in all phases, so there is advantageously no variation in contact from phase to phase.

When a tensile load is applied in the axial direction of the joint, the boundary portion 34 between the cutoff portion 33 of the inner ring 28 and the outer peripheral surface 26 thereof may be engaged in the inner spherical surface 31 of the cage 30; however, as stated above, the boundary portion 34 between the cutoff portion 33 of the inner ring 28 and the outer spherical surface 26 thereof is rounded, whereby, when a tensile load is applied in the axial direction of the joint, it is possible to prevent in advance the boundary portion 34 between the cutoff portion 33 of the inner ring 28 and the outer spherical surface 26 thereof from being engaged in the inner spherical surface 31 of the cage 30.

While in this embodiment the cutoff portion 33 is of a conical configuration, this is to be construed as a mere example; the configuration of the cutoff portion 33 may be one other than a conical surface as long as the function of the joint is not impaired, and the contour of the outer spherical surface 26 of the inner ring 28 is contained so as to avoid interference with the socket portion 35 of the cage 30. Regarding the method of machining the cutoff portion 33, various methods are available, including turning and forge finishing.

Figure 6A:
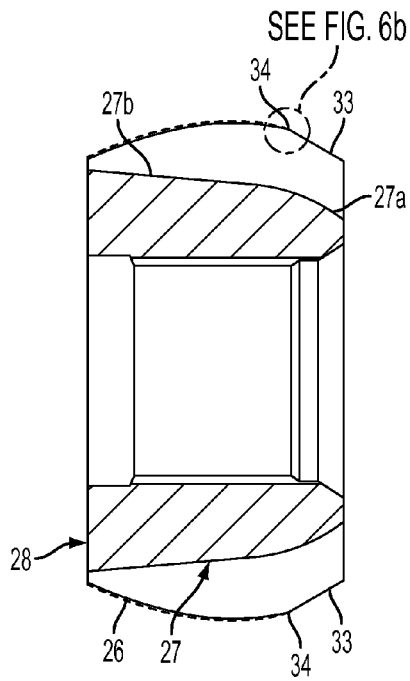
FIG. 6a is a sectional view showing another example of the boundary portion between the cutoff portion and the outer spherical surface according to another embodiment of the present invention.
Figure 6B:
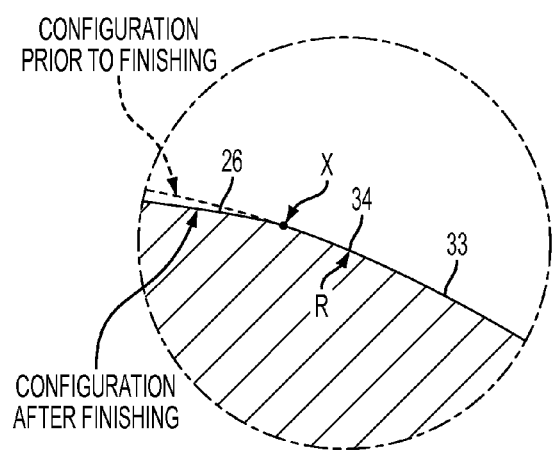

Further, while in the above-mentioned embodiment the rounded configuration of the boundary portion 34 between the cutoff portion 33 and the outer spherical surface 26 is one connected to both the cutoff portion 33 and the outer spherical surface 26 at a tangent, it is also possible, as shown in FIG. 5a and FIG. 5b, to perform simultaneous machining at the time of finishing of the outer spherical surface 26 of the inner ring 28 such that the boundary portion 34 and the outer spherical surface 26 are connected at a tangent; the cutoff portion 33 and the boundary portion 34 with no finishing performed thereon may not be of a rounded configuration connected at a tangent, but allow appearance of an edge X. Further, as shown FIG. 6a and FIG. 6b, prior to the finishing of the outer spherical surface 26 of the inner ring 28, the boundary portion 34 between the cutoff portion 33 and the outer spherical surface 26 is rounded, and, at the time of the finishing, machining is performed such that the outer spherical surface 26 exhibits a rounded finished configuration, whereby, although, strictly speaking, an edge Y appears between the finished configuration of the outer spherical surface 26 and the boundary portion 34, the angle therebetween becomes obtuse, so it can be formed into a configuration that is not easily allowed to be engaged in the inner spherical surface 31 of the cage 30. Also regarding the machining method for the boundary portion 34, various methods are available, including forge finishing, turning, grinding, shot, and tumbling.

Figure 7:
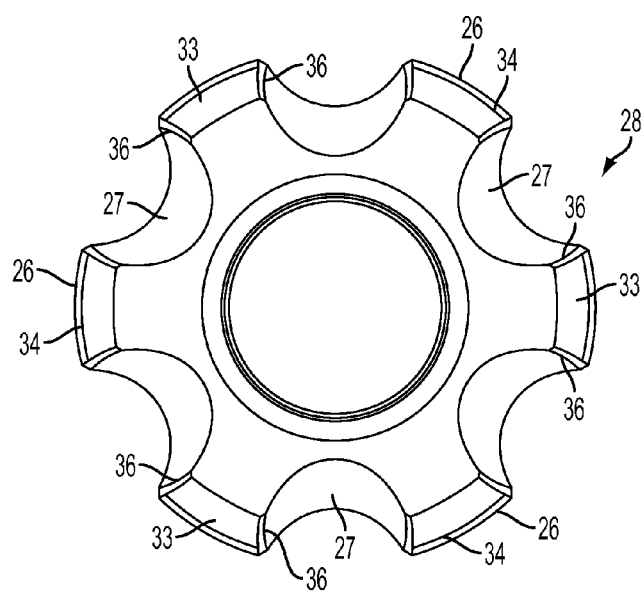
FIG. 7 is a sectional view showing an inner ring, in which chamfered portions are provided at boundary portions between the outer spherical surface and track grooves according to another embodiment of the present invention.

In the above-mentioned embodiment, the outer ring opening side portion of the outer spherical surface 26 of the inner ring 28 is cut off, and the boundary portion 34 between the cutoff portion 33 and the outer spherical surface 26 is rounded; in addition to this construction. as shown in FIG. 7, it is possible to provide chamfered portions 36 between the outer spherical surface 26 and the track grooves 27 of the inner ring 28. The chamfered portions 36 are formed at all the boundary portions between the outer spherical surface 26 and the track grooves 27 of the inner ring 28.

With this construction, as compared with the case in which chamfered portions are provided at the boundary portions between the outer spherical surface and the track grooves of an inner ring with no cutoff portion as described above, and as compared with the case in which, of the chamfered portions formed at the boundary portions between the outer spherical surface and the track grooves of the inner ring, the chamfered portions situated at positions corresponding to a part of the phases are formed so as to be larger than the chamfered portions situated at positions corresponding to the other phases (see, for example, Patent Document 3), it is possible to make the chamfered portions smaller than the chamfered portions requisite for the insertion into the cage, making it possible to secure the load capacity requisite for the track grooves.

In the constant velocity universal joint of the above-mentioned embodiment, the track grooves 22 and 27 of the outer ring 25 and the inner ring 28 are tapered, whereby an increase in operating angle is easily realized without involving an increase in the outer diameter of the outer ring 25; in this regard, in order that the strength and workability of the outer ring 25 may not be reduced even when the wall thickness of the outer ring 25 is reduced, the influence and tendency of the inner force consisting of the track load, pocket load, and spherical force was examined with respect to the inner elements of the fixed constant velocity universal joint, and finite element method (FEM) analysis was performed, with the result that the range of the tapering angle α of the track grooves 22 and 27 was narrowed down, the upper limit value thereof being decided on 12° as the optimum value.

First, when the tapering angle α is increased, the maximum value of the pocket load increases; however, this involves no problem because it is possible to secure the requisite strength by increasing the wall thickness of the outer ring 25 at the phase where the balls 29 are in the innermost position, and increasing the wall thickness of the cage by increasing the cage offset amount.

Figure 8:
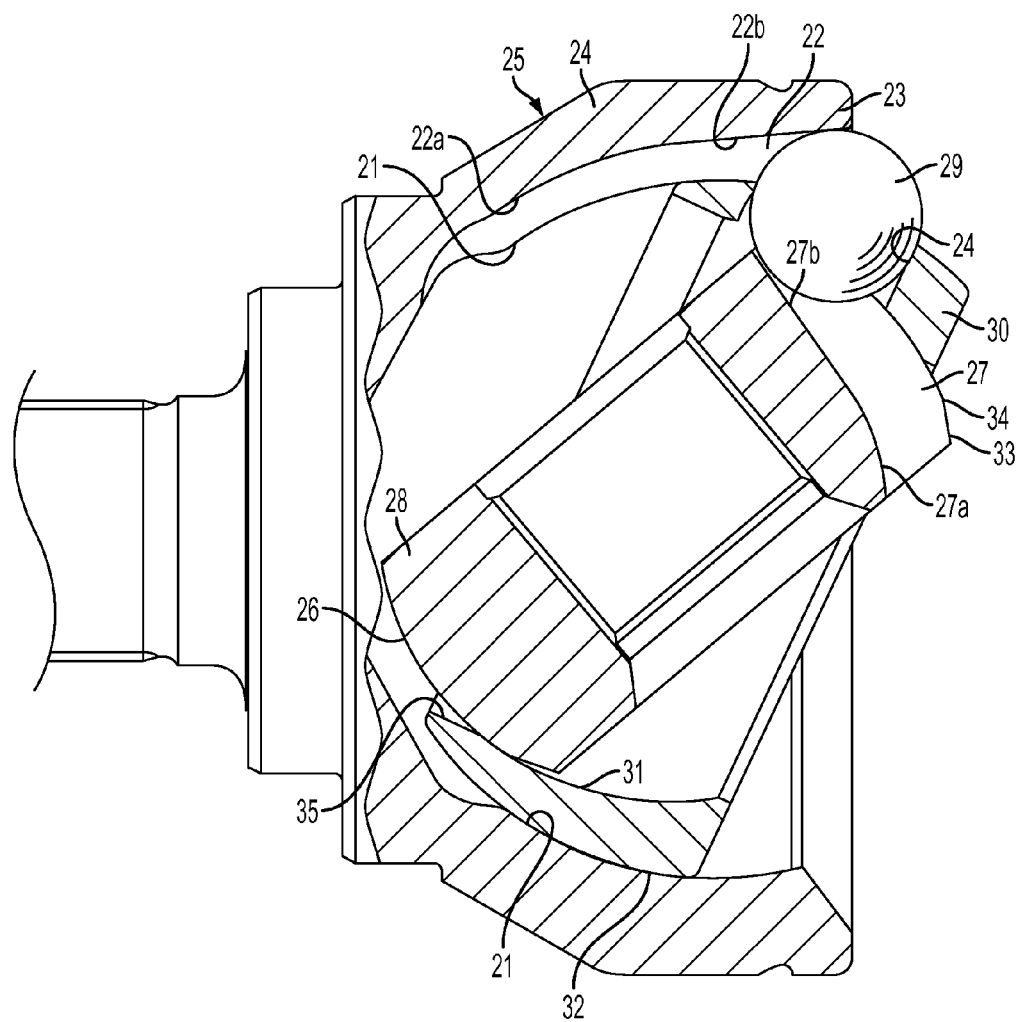
FIG. 8 is a sectional view showing a state in which the fixed constant velocity universal joint assumes an operating angle according to the embodiment of the present invention.
Figure 9A:
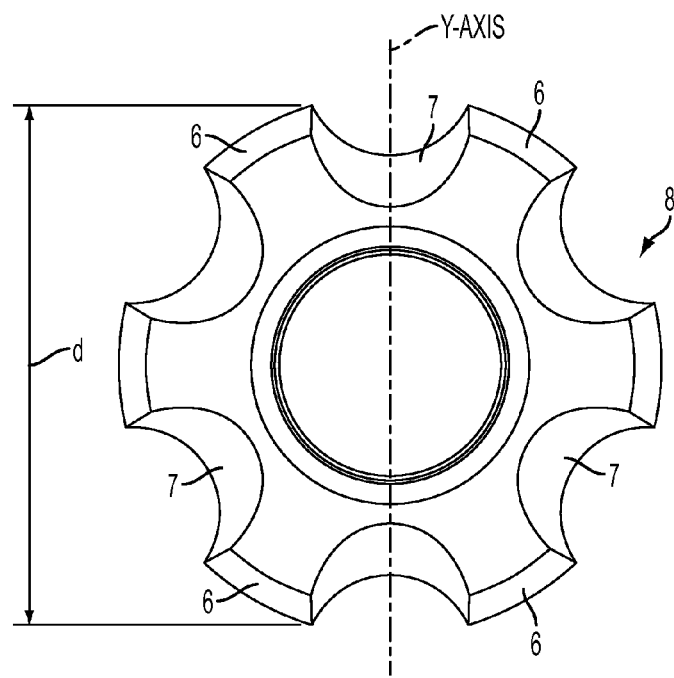
FIG. 9a is a diagram showing a conventional fixed constant velocity universal joint in a state prior to insertion of an inner ring into a cage.
Figure 9B:
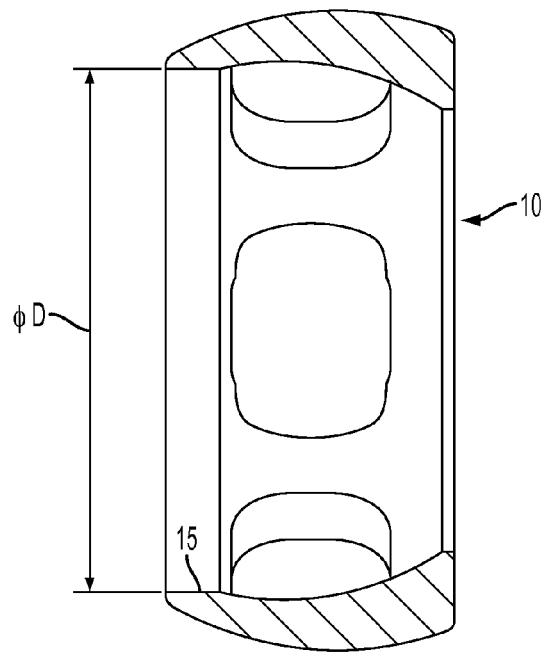
Figure 10:
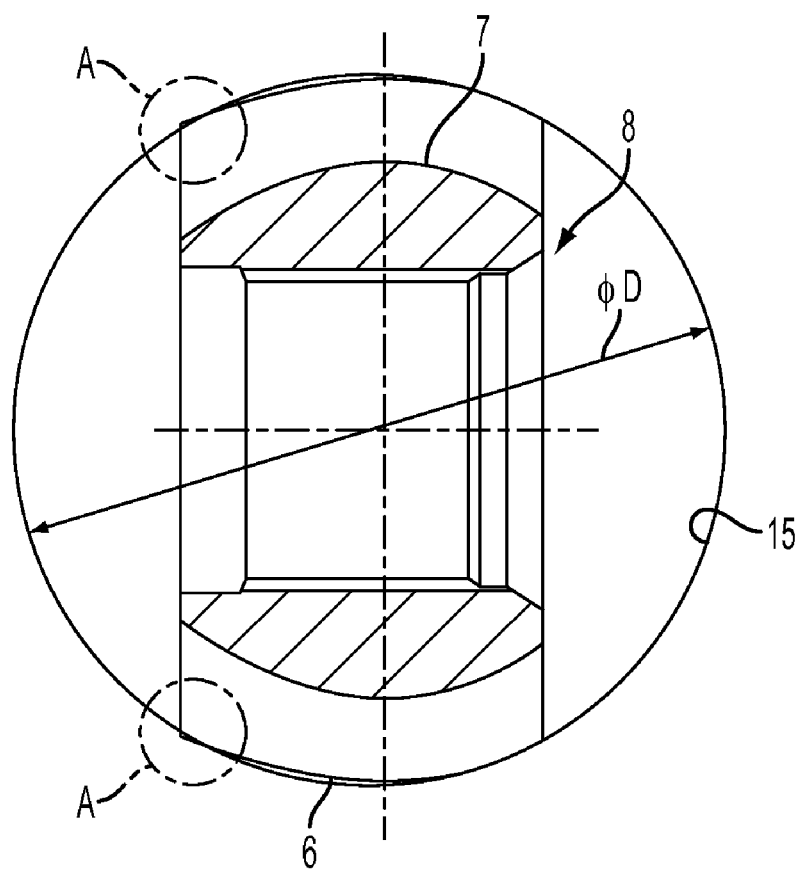
FIG. 10 is a diagram showing the conventional fixed constant velocity universal joint in a state after the insertion of the inner ring into the cage.

Next, to determine the upper limit value of the tapering angle α, a finite element method (FEM) analysis was executed. When the tapering angle α increases, the inner force (the track load and the pocket load) is reduced at the phase where the balls 29 are most likely to stick out (see FIG. 8, which shows a state in which the joint assumes an operating angle), which is advantageous in terms of strength; however, because it is at the opening end 23 of the outer ring 25 and exhibits a small wall thickness, the value of the stress generated in the track grooves 22 was converted to joint strength to check the tendency. As a result, when the tapering angle α is 12.9°, the joint strength is below the requisite strength, so, as the optimum range for the tapering angle α, the upper limit value thereof was decided on 12°.

In the above-mentioned embodiment, the track grooves 22 of the outer ring 25 are of the tapered shape so as to be diverged linearly toward the opening end 23, and the track grooves 27 of the inner ring 28 are of the tapered shape so as to be diverged linearly toward an end on the opposite side of the opening; the outer spherical surface center and the inner spherical surface center of the cage 30 are axially offset in opposite directions by the same distance from the joint center, and the center of curvature of the track grooves 22 of the outer ring 25 and the center of curvature of the track grooves 27 of the inner ring 28 are offset by the cage offset amount with respect to the joint center, whereby a high-angle structure is realized for a constant velocity universal joint; the present invention, however, is not restricted to the above-mentioned construction; it is also applicable to other fixed constant velocity universal joints (e.g., BJ and UJ).

The invention claimed is:

1. A fixed constant velocity universal joint, comprising:
   an outer member having an opening, an inner spherical surface, and a plurality of track grooves, said plurality of track grooves being in said inner spherical surface, being arranged at equal circumferential intervals, and extending axially toward said opening;
   an inner member having an outer spherical surface and a plurality of axially extending track grooves, said plurality of axially extending track grooves being paired with said track grooves of said outer member and being arranged at equal circumferential intervals;
   a plurality of balls interposed between said track grooves of said outer member and said axially extending track grooves of said inner member, said plurality of balls configured to transmit torque; and
   a cage interposed between said inner spherical surface of said outer member and said outer spherical surface of said inner member, said cage configured to hold said balls,
   wherein an outer member opening side portion of said outer spherical surface of said inner member is cut off, thereby forming a cutoff portion, a boundary portion being obtained between said cutoff portion and said outer spherical surface, and said outer spherical surface being rounded,
   wherein said track grooves of said outer member are tapered so as to be linearly diverged toward said opening,
   wherein said track grooves of said inner member are tapered so as to be linearly diverged toward a side opposite to said opening,
   wherein an outer spherical surface center and an inner spherical surface center of said cage are offset axially in opposite directions by the same distance with respect to a joint center, and
   wherein a center of curvature of said track grooves of said outer member and a center of curvature of said axially extending track grooves of said inner member are offset with respect to the joint center by an amount corresponding to the cage offset amount.

2. A fixed constant velocity universal joint according to claim 1, wherein said track grooves of the outer member and said axially extending track grooves of said inner member are tapered at an angle of 12° at a maximum with respect to an axial direction.

3. A fixed constant velocity universal joint, comprising:
   an outer member having an opening, an inner spherical surface, and a plurality of track grooves, said plurality of track grooves being in said inner spherical surface, being arranged at equal circumferential intervals, and extending axially toward said opening;
   an inner member having an outer spherical surface and a plurality of axially extending track grooves, said plurality of axially extending track grooves being paired with said track grooves of said outer member and being arranged at equal circumferential intervals;
   a plurality of balls interposed between said track grooves of said outer member and said axially extending track grooves of said inner member, said plurality of balls configured to transmit torque; and
   a cage interposed between said inner spherical surface of said outer member and said outer spherical surface of said inner member, said cage configured to hold said balls,
   wherein an outer member opening side portion of said outer spherical surface of said inner member is cut off, thereby forming a cutoff portion, a boundary portion being obtained between said cutoff portion and said outer spherical surface, and said outer spherical surface being rounded,
   wherein said track grooves of said outer member and said axially extending track grooves of said inner member are tapered at an angle of 12° at a maximum with respect to an axial direction.

4. A fixed constant velocity universal joint, comprising:
an outer member having an opening, an inner spherical surface, and a plurality of track grooves, said plurality of track grooves being in said inner spherical surface, being arranged at equal circumferential intervals, and extending axially toward said opening;
an inner member having an outer spherical surface and a plurality of axially extending track grooves, said plurality of axially extending track grooves being paired with said track grooves of said outer member and being arranged at equal circumferential intervals;
a plurality of balls interposed between said track grooves of said outer member and said axially extending track grooves of said inner member, said plurality of balls configured to transmit torque;
a cage interposed between said inner spherical surface of said outer member and said outer spherical surface of said inner member, said cage configured to hold said balls; and
chamfered portions disposed at boundary portions between said outer spherical surface and said axially extending track grooves of said inner member,
wherein an outer member opening side portion of said outer spherical surface of said inner member is cut off, thereby forming a cutoff portion, a boundary portion being obtained between said cutoff portion and said outer spherical surface, and said outer spherical surface being rounded,
wherein said track grooves of said outer member are tapered so as to be linearly diverged toward said opening,
wherein said axially extending track grooves of said inner member are tapered so as to be linearly diverged toward a side opposite to said opening,
wherein an outer spherical surface center and an inner spherical surface center of said cage are offset axially in opposite directions by the same distance with respect to a joint center, and
wherein a center of curvature of said track grooves of the outer member and a center of curvature of said axially extending track grooves of said inner member are offset with respect to the joint center by an amount corresponding to the cage offset amount.

5. A fixed constant velocity universal joint according to claim 4, wherein said track grooves of the outer member and said axially extending track grooves of said inner member are tapered at an angle of 12° at a maximum with respect to an axial direction.

6. A fixed constant velocity universal joint, comprising:
an outer member having an opening, an inner spherical surface, and a plurality of track grooves, said plurality of track grooves being in said inner spherical surface, being arranged at equal circumferential intervals, and extending axially toward said opening;
an inner member having an outer spherical surface and a plurality of axially extending track grooves, said plurality of axially extending track grooves being paired with said track grooves of said outer member and being arranged at equal circumferential intervals;
a plurality of balls interposed between said track grooves of said outer member and said axially extending track grooves of said inner member, said plurality of balls configured to transmit torque;
a cage interposed between said inner spherical surface of said outer member and said outer spherical surface of said inner member, said cage configured to hold said balls; and
chamfered portions disposed at boundary portions between said outer spherical surface and said axially extending track grooves of said inner member,
wherein an outer member opening side portion of said outer spherical surface of said inner member is cut off, thereby forming a cutoff portion, a boundary portion being obtained between said cutoff portion and said outer spherical surface, and said outer spherical surface being rounded,
wherein said track grooves of the outer member and said axially extending track grooves of said inner member are tapered at an angle of 12° at a maximum with respect to an axial direction.

* * * * *